US007445184B1

(12) United States Patent
Johnson

(10) Patent No.: US 7,445,184 B1
(45) Date of Patent: Nov. 4, 2008

(54) MOBILE PAINT RACK

(75) Inventor: Bryan Thomas Johnson, Vadnais Heights, MN (US)

(73) Assignee: Innovative Tools & Technologies, Inc., St. Paul, MN (US)

( * ) Notice: Subject to any disclaimer, the term of this patent is extended or adjusted under 35 U.S.C. 154(b) by 0 days.

(21) Appl. No.: 10/836,579

(22) Filed: May 1, 2004

Related U.S. Application Data

(60) Provisional application No. 60/468,250, filed on May 5, 2003.

(51) Int. Cl.
*F16M 11/00* (2006.01)

(52) U.S. Cl. .................... 248/176.1; 248/181.1; 269/45

(58) Field of Classification Search ................. 248/127, 248/158, 161, 157, 424, 176.1, 181.1, 181.2; 269/45, 17; 211/22, 24
See application file for complete search history.

(56) References Cited

U.S. PATENT DOCUMENTS

| | | | | | |
|---|---|---|---|---|---|
| 569,289 | A | * | 10/1896 | Lynch | 211/17 |
| 653,519 | A | * | 7/1900 | Masters | 211/22 |
| 2,669,958 | A | * | 2/1954 | Sweeney | 269/45 |
| 2,803,872 | A | * | 8/1957 | Massa | 269/37 |
| 2,827,690 | A | * | 3/1958 | Brown | 269/17 |
| 3,858,864 | A | * | 1/1975 | Waldow | 269/17 |
| 4,245,786 | A | * | 1/1981 | Abrahamsen et al. | 239/242 |
| D303,031 | S | * | 8/1989 | Ellis | D34/31 |
| 4,880,194 | A | | 11/1989 | Geise et al. | |
| 5,675,417 | A | * | 10/1997 | Ventura et al. | 356/600 |
| 5,709,373 | A | * | 1/1998 | Wasylynko | 269/16 |
| 6,024,348 | A | * | 2/2000 | Ventura et al. | 269/17 |
| 6,173,947 | B1 | | 1/2001 | Johnson | |
| 6,409,128 | B1 | | 6/2002 | Deshler | |
| 6,491,755 | B1 | | 12/2002 | Meinke | |

* cited by examiner

*Primary Examiner*—A. Joseph Wujciak, III
(74) *Attorney, Agent, or Firm*—Mueting, Raasch & Gebhardt, P.C.

(57) ABSTRACT

A mobile paint rack having a base and an upright mounted on the base, the upright receiving at least a pair of clamp arms releasably received by a pair of support carriages, each carriage for releasably receiving a clamp arm at a distal end thereof, one at each end of each carriage. A swivel clamp is mounted on each clamp arm to a swivel ball, the swivel ball in turn is mounted to the proximal end of each clamp arm. The swivel clamp on the clamp arm may be positioned in an extremely wide variety of positions on the end of the clamp arm. Once the swivel clamp is positioned in a desired manner, it is screw locked into place. Additionally, the clamp arms themselves may be adjusted such that where two swivel clamps are needed to securely position an article for spray painting, two swivel clamps may be positioned as close as 1 inch together and as far apart as 36 inches. Also, the clamp arms themselves may be adjusted such that where more than two clamps are needed to securely position an article for spray painting, the additional clamp arms may be positioned adjacent each other by adjusting the position of or even adding a support carriage.

25 Claims, 6 Drawing Sheets

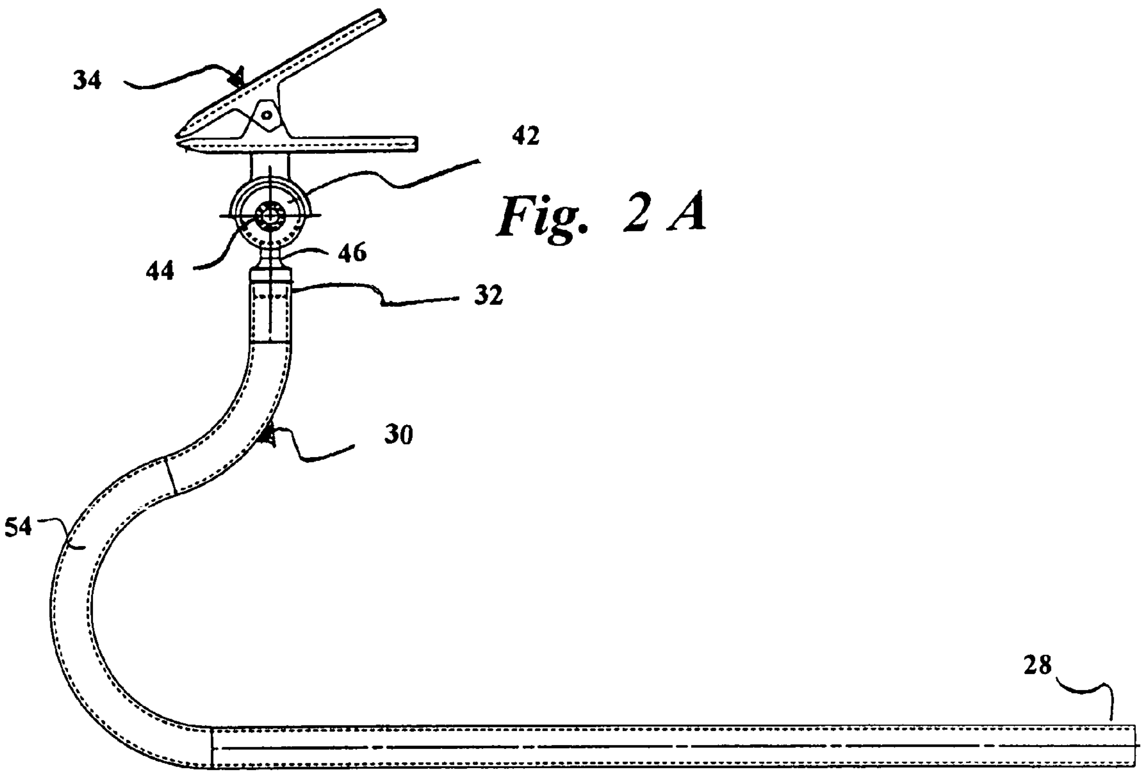
Fig. 2 A
Fig. 2 B
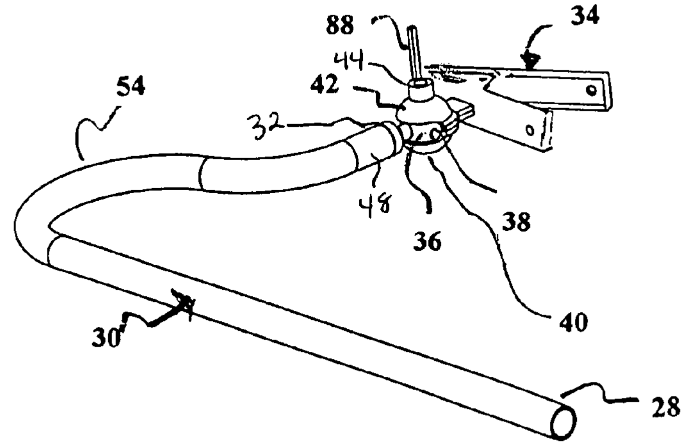

Fenders

Side Moldings

Grilles and Grille Mounting Panels

Saturn Door Skins

Wheel Flares

Filler Panels

Rocker Moldings

Mirror and Door Handles

Filler Panels, Mud Flaps, Misc. Parts

MOBILE PAINT RACK

This application is a non-provisional application filed under et U.S.C. §111(a) claiming priority of the provisional application Ser. No. 60/468,250, filed May 5, 2003.

BACKGROUND

This invention is directed generally to holders for positioning parts for ease of painting, refinishing or repairing and specifically to holders for positioning for painting and storing while drying automotive parts.

In automobile body repair and restoration, because of the highly specialized paints formulated to provide a high gloss, smooth even finish free of defects, the need sometimes arises to disassemble the auto into it's component parts for painting. Great care must be taken to avoid defects such as runs or over-spray. An important factor in achieving a good painting result is being able to easily move and re-orient articles being painted. Use is made of light reflecting off the component parts to determine where and how much paint to spray. Many prior art devices are provided that are highly specialized in that they hold only one type of automotive component parts, such as bumpers. A further limitation of the prior art devices is their tendency to occupy a large amount of floor space.

There remains a need to provide a more efficient, cost effective, extremely adjustable and useful mobile paint stand.

SUMMARY

The present invention is directed to a mobile paint rack that meets these needs to provide a more efficient, easy to use, cost effective and extremely adjustable mobile paint rack. The present invention includes a mobile paint rack having a wheeled base and a vertically supported central upright having support carriages mounted thereon. Each support carnage releasably receives a pair of clamp arms at each end of each support carriage. Each clamp arm has a swivel clamp mounted at an end thereof. Once in position, a screw lock holds each clamp arm in a selected location. Additional screw locks also hold each swivel clamp in the desired location. Because the swivel clamp may be positioned in an extremely wide variety of positions on the end of the clamp arm, it permits the mobile pain track to securely position for painting a wide variety of different sized articles. This extreme amount of adjustability permits one rack to be used and re-used for painting and then storing during the drying phase a wide variety of different sized and shaped articles. Additionally, the swivel clamp themselves may be adjusted such that where two swivel clamps are needed to securely position an article for spray painting, the swivel clamps may be positioned as close as 1 inch together and as far apart as 36 inches.

By holding the items to be painted upright rather than the current practice of laying them down horizontally on a surface, the paint applied doesn't "pool" to the lowest edge marring the finish. Also, a better "color match" is obtained when the user can better see the paint that is being applied. Additionally, by holding the items to be painted in an upright position, less ambient dust settles on the newly painted surface again marring the finish. Additionally, the parts being painted using this paint rack take up less floor space than the traditional practice of lining up parts on the floor method. Also, once painted, multiple loaded mobile paint racks may be positioned adjacent each other or "nested" during the paint drying phase, again taking up less floor space than the current practice.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

Understanding of the invention will be enhanced by referring to the accompanying drawings, in which like numbers refer to like parts in the several views and in which:

FIG. 2A is a close up side view of the adjustable clamp arm portion of the device of FIG. 1;

FIG. 2B is a close up perspective view of the adjustable clamp arm portion of the device of FIG. 1;

DETAILED DESCRIPTION OF THE CURRENTLY PREFERRED EMBODIMENTS

Understanding of the invention will be further enhanced by referring to the following illustrative but non-limiting example.

The device of this invention is a mobile paint rack, of steel or other rigid materials, having a base on which is supported an upright which in turn receives and supports at least a pair of support carriages. The support carriages, pairs of tubular elements which may themselves be adjusted vertically on the upright, in turn releasably receive clamp arms, one at each end of each support carriage. One support carriage can receive up to four clamp arms. A swivel clamp is swivel mounted onto each clamp arm, the swivel clamp mounting is accomplished by a swivel ball mounted to a proximal end of the clamp arm, and a socket receiver having a slot formed therein, mounted on a clamp forming a swivel clamp. The swivel ball of the clamp arm is received by the socket receiver of the swivel clamp. The swivel clamp may be positioned in an extremely wide variety of positions on the end of the clamp arm. Once the swivel clamp is position in a desired manner, it is screw locked into place. The swivel clamp may include a clamp pin, mounted on the pinching end of the swivel clamp, the pin extending from both side of the swivel clamp such that interior portions of the part to be painted is captured by the points of this pin. Because the clamp arms, tubular structures, are received by receiver tubes of the support carriage, the clamp arms may be rotated within the receiver tubes 360 degrees which enable the clamp arms to be positioned in an extremely wide variety of positions on the support carriage. Once a clamp arm is positioned in a desired location, it is also screw locked into position. The clamp arms themselves may be adjusted such that where two swivel clamps are needed to securely position an article for spray painting, two swivel clamps may be positioned as close as 1 inch together and as far apart as 36 inches. Additionally, where the weight of the article to be painted is such that more than two the clamp arms with attached swivel clamps are needed to support the article, the clamp arms themselves may be positioned as close as 1 inch together and as far apart as the length of the upright.

Figure 1:
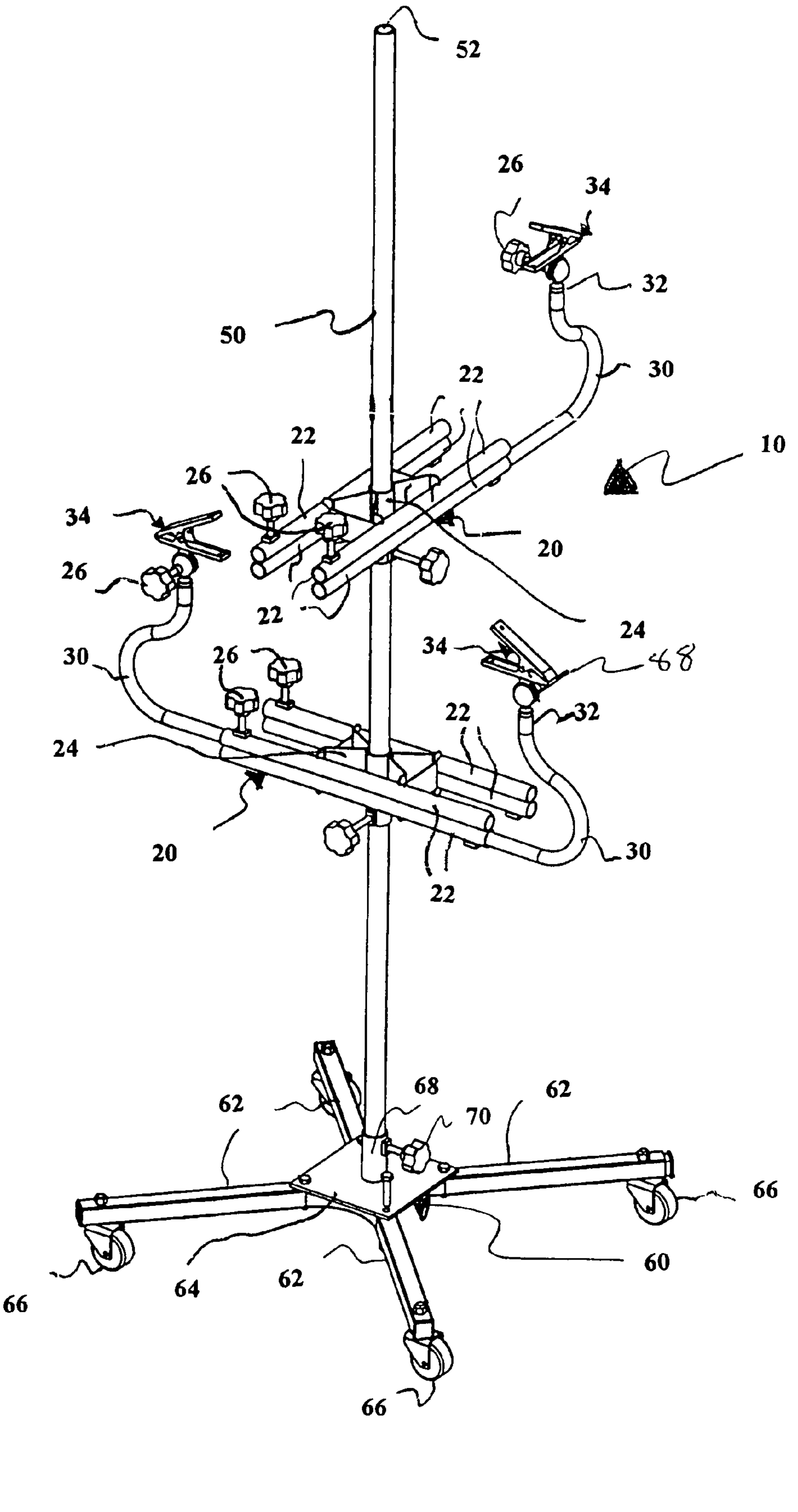
FIG. 1 is a perspective view of the device of this invention.
Figure 5:
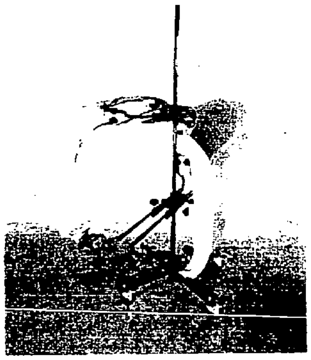
FIG. 5 is a series of photographs showing the device of this invention in some of its many positions of use.
Figure 5:
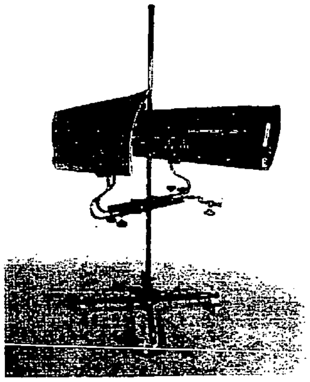
Figure 5:
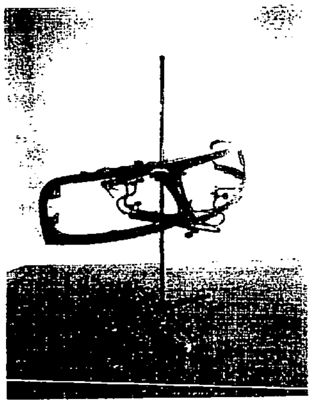
Figure 5:
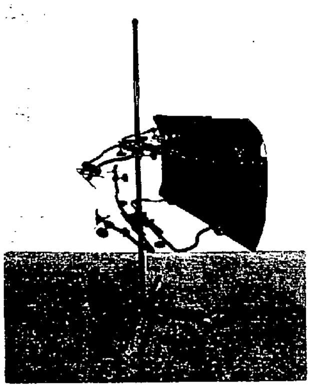
Figure 5:
Figure 5:
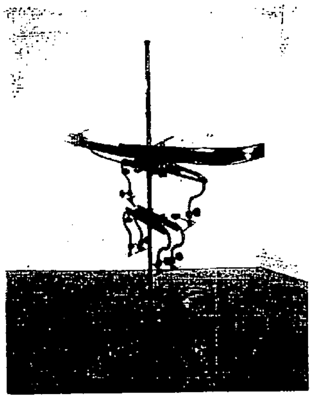
Figure 5:
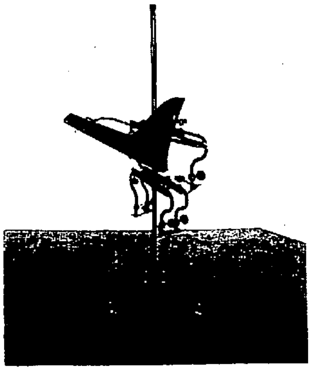
Figure 5:
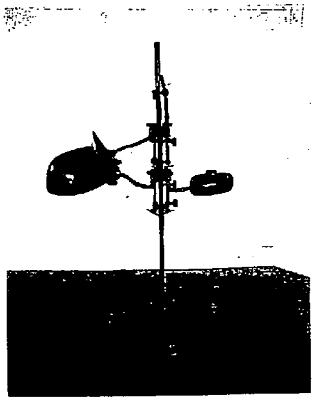
Figure 5:
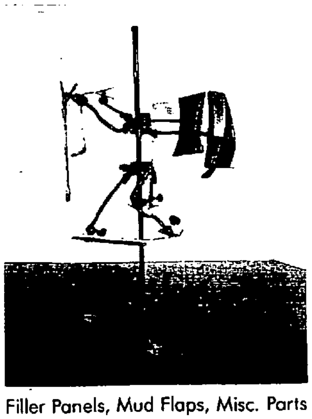

Turning now to the drawings, in which like reference characters refer to corresponding elements throughout the several views, FIG. 1 illustrates a mobile pain track 10, of steel or other rigid materials, having a base 60 on which is supported an upright 50, of unitary construction, which in turn receives and supports at least a pair of support carriages. The support carriages 20, pairs of tubular elements or receiver tubes 22 may themselves be adjusted vertically on the upright 50, in turn releasably receive clamp arms 30, one at each end of each receiver tube 22. One support carriage 20 can receive up to four clamp arms 30. A swivel clamp 34, shown in detail in FIGS. 2A & B, is swivel mounted onto each clamp arm 30, the swivel mounting is accomplished by a swivel ball 36 mounted to a proximal end 32 of the clamp arm 30, and a socket receiver 42 having a slot formed therein, mounted on a swivel clamp 34. The swivel ball 36 of the clamp arm 30 is received by the socket receiver of the swivel clamp 34. The swivel clamp 34 may be positioned in an extremely wide variety of positions on the end of the clamp arm 30. Once the swivel clamp 34 is positioned in a desired manner, it is screw locked into place by positioning knob 26. The swivel clamp 34 may include a clamp pin 88, mounted on the pinching end of the swivel clamp 34, the pin extending from both side of the swivel clamp 34 such that interior portions of the part to be painted is captured by the points of this pin 83. Because the clamp arms 30, tubular structures, are received by receiver tubes 22 of the support carriage 20, the clamp arms 30 may be rotated 360 degrees within the receiver tubes 22 which enable the swivel clamp 34 to be positioned in an extremely wide variety of positions on the support carriage 20. Once a swivel clamp is positioned in a desired location, it is also screw locked into position by positioning knob 26. The clamp arms 30 themselves may be adjusted such that where two swivel clamps 34, as illustrated in the multiple illustrations of FIG. 5 are needed to securely position an article for spray painting, two swivel clamps 34 on clamp arms 30 may be positioned as close as 1 inch together and as far apart as 36 inches. Additionally, where the weight of the article to be painted is such that more than two the swivel clamps 34 are needed to support the article, the clamp arms 30 themselves may be positioned as close as 1 inch together and as far apart as the length of the upright.

A mobile paint rack 10 is shown having an upright 50 supported by a base 60 and topped by a cap 52. The base 60 has, in the preferred embodiment, four feet 62 interconnected by a base plate 64, each foot 64 having a roller 66 mounted thereto to provide mobility to the rack 10 although the base 60 could be placed directly on a floor or other planar surface. Upright receiver 68 receives upright 50 and is held fast by means of upright receiver screw knob 70. The upright 50 in turn supports at least one support carriage 20. Braces 24 attach each support carriage 20 to the upright 50. In the preferred embodiment, two support carriages 20 are mounted by a brace 24 to the upright 50 although a single support carriage could be used. Additionally, more than two support carriages 20 could be mounted on the upright 50.

Each support carriage 20 releasably receives a pair of adjustable clamp arms 30. The support carriage 20 has screw fasteners with positioning knobs 26 with pointed ends to more firmly hold the clamp arms 30 in place in the desired positions. Rubber sleeves 54 shield the adjustable clamp arms 30 to protect the rack 10 from "overspray" that might seal the clamp arms in a fixed position that would lessen the adjustability of the clamp arms 30. Using the rubber sleeves 54 protects this area from "overspray" Additionally, rubber guards 48 shield the swivel clamp 34 from "overspray" for the same reason. Rubber sleeves 54 and rubber guards 48 are indicated in FIG. 3 and could be positioned on any tubular joining as needed.

Each support carriage 20 has at least a pair of receiver tubes 22 mounted thereto. The receiver tubes 22 each receive a clamp arm 30 at the distal end 28 thereof. In the preferred embodiment, each support carriage 20 has two pair of receiver tubes 22 for receiving four clamp arms 30, as shown in FIGS. 1, 3-5. Screw fasteners with positioning knobs 26 with pointed ends to more firmly hold the clamp arms 30 in place in the desired positions.

Figure 2C:
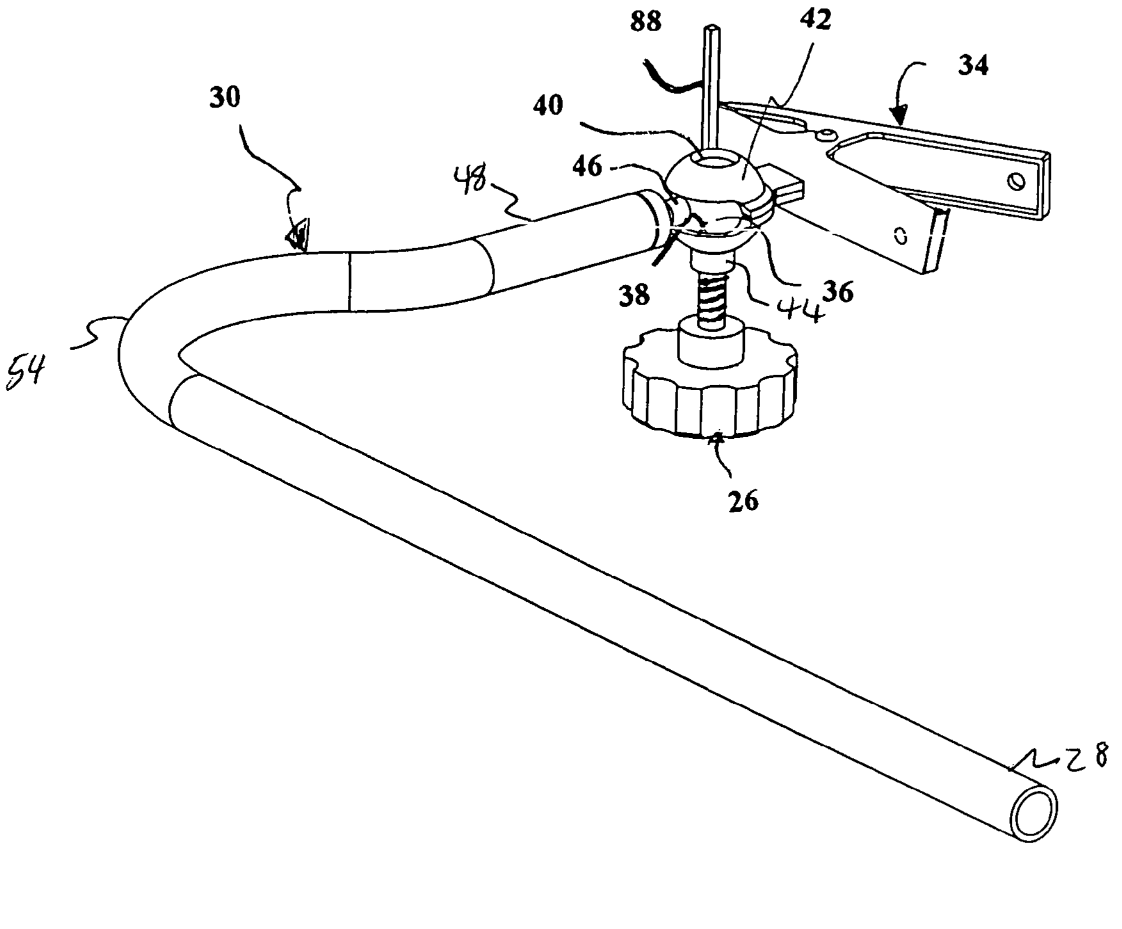
FIG. 2C is a close-up perspective view of the adjustable clamp arm portion from the side opposite FIG. 2B.

FIG. 2A and FIG. 2B show an adjustable clamp arm 30, having a generally shepherds' hook shape with, mounted at a proximal end 32 thereof, a swivel clamp 34. Each adjustable clamp arm 30 has mounted thereto a swivel ball 36. The swivel ball 36 is received by a socket 42 mounted to the swivel clamp 34, a swivel ball stem 46 is received by a slot 38 permitting movement of the swivel mounted swivel clamp 34 about the clamp arm 30. Because the socket receiver 42 moves about the swivel ball 36, the swivel clamp 34 may be positioned in a great variety of positions, a limited selection of potential positions is shown in the illustrations of FIG. 5. A screw fastener with a positioning knob 26 as described above, shown at FIGS. 1 & 3, releasably fastens the swivel clamp in a desired position. Aperture 40 is formed in socket receiver opposite positioning knob 26. This aperture 40 permits positioning knob 26 to be hand tightened in the selected position. Socket receiver 42 has stem 44 mounted thereon, the stem 44 receives the screw fastener with a positioning knob 26. As shown in FIG. 2C, an aperture 40 is formed in the socket 42 opposite the screw fastener with a positioning knob 26 permits the socket 42 to be firmly fastened without additional torque being applied thereto. Swivel clamp 34 has a clamp pin 88 mounted thereon that extends from the swivel clamp 34 and aids in supporting the object being held by the swivel clamp for painting. Rubber sleeve 54 and rubber guards 48 that may be positioned where needed on clamp arm 30 to prevent "overspray" that could potentially reduce the flexibility of the device of this invention.

Figure 3:
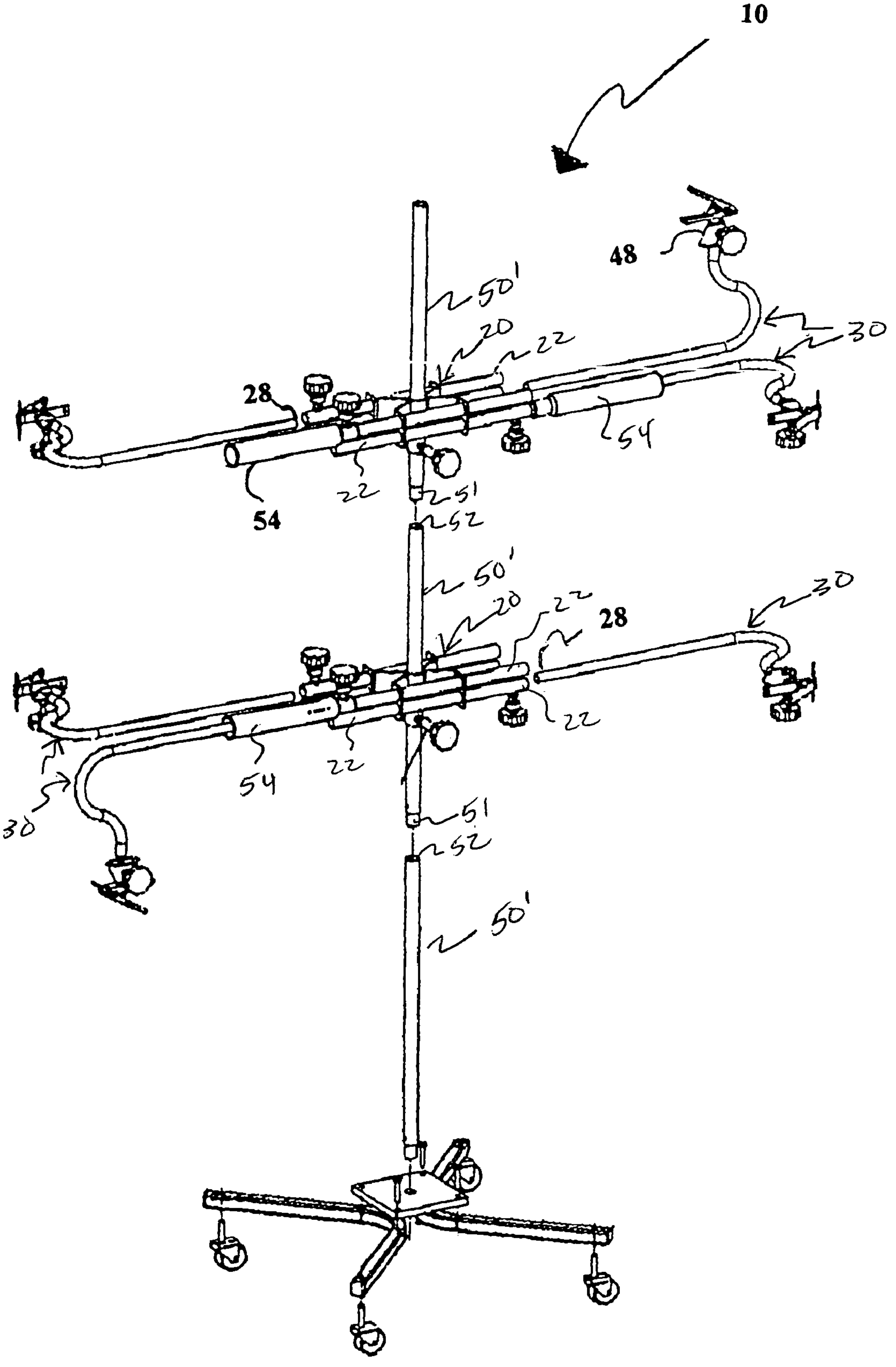
FIG. 3 is an exploded view of the device of FIG. 1.

FIG. 3 is provided to show how the device of this invention is assembled for use. In this an embodiment, upright 50' is formed of multiple parts that fit together with male ends 51 received by female ends 53. Clamp arms 30 are shown disassembled from paint rack 10 to show how they are received by receiver tubes 22 of carriage support 20. Rubber sleeve 54 is shown positioned on receiver tube 22 to receive clamp arm 30 where needed on clamp arm 30 to prevent "overspray".

Figure 4:
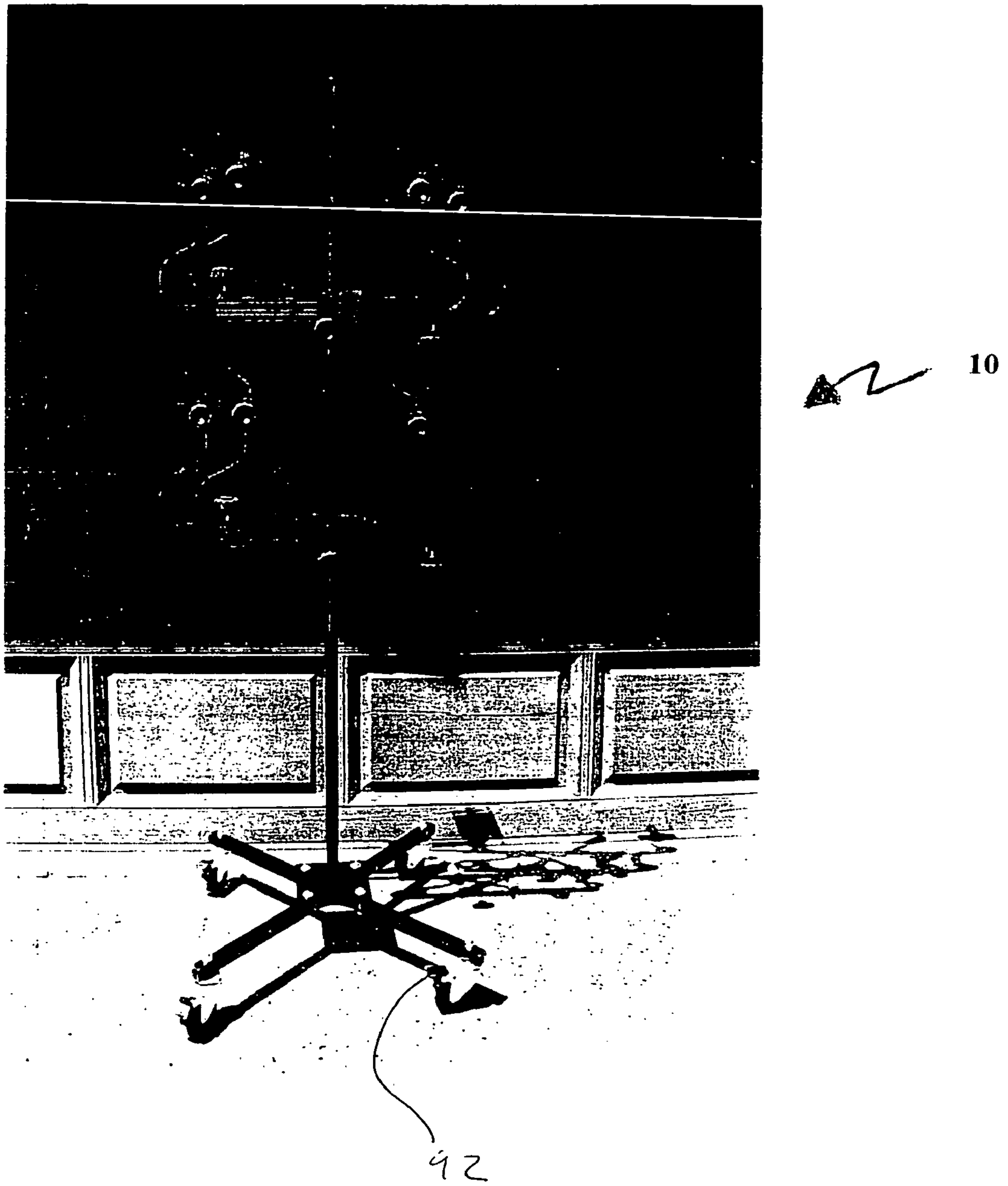
FIG. 4 is a photograph of the device of the invention of FIG. 1 in its storage position.

FIG. 4 is provided to show the mobile paint rack 10 in its storage position with the clamp arms 30 positioned in an upright, out of the way position. Additionally, casters 66 are shown with locks.

FIG. 5 is provided to show a selection of some of the possible positions the paint rack 10 can assume for use. As illustrated, in some cases the weight or size of the article to be painted requires more than two attachments to the paint rack 10 to adequately support the article during spray painting.

Getting the best possible color match requires painting the automotive parts in the same position they assume when mounted on a car. Metallic paints, in particular, lay down differently when sprayed vertically versus horizontally, which can affect the resulting color. The mobile paint rack 10 of the present invention offers a wide variety of adjustments to hold parts in the positions needed, shown at FIG. 5. Each clamp arm 30 on the support carriage 20 can be adjusted vertically by re-positioning the support carriage 20 vertically along upright 50 and screw fastened with a positioning knob 26. The clamp arm 30 and swivel clamp 34 assemblies individually swivel and rotate. The clamp arms 30 also telescope to the needed positions. Clamp arm 30 are of a length to permit a few inches to be received by receiving tubes 22 or contracted such that several inches of the clamp arm 30 are receive by receiver tubes 22 permitting adjustment of the clamp arm 30 in length. Two adjacent receiver tubes 22 with the associated clamp arms 30 and associated clamp 34 can be positioned as close as one inch apart. The maximum distance the swivel clamps 34 can be placed apart is only dependent on the length of the clamp arms 30 and the length of the receiver tubes 22 of the support carriage 20.

In one embodiment, eight rotating clamp arms 30 with associated swivel clamps 34 with pins 88 can be positioned at any angle, then locked tight. This allows the user to attach parts to be painted to the paint rack such that the user can then handle parts, by moving the paint rack, without touching a painted surface. The casters 66 lock and unlock with caster lock 92 to provide easy movement through the shop as well as stability while the paint rack is used for painting parts. The device of this invention holds parts in the same position that the parts are in when mounted on a car. This helps in getting the best color match possible. Additionally, by disassembling the parts from each other and then placing on the paint rack 10, total access is gained to the parts when painting which result in better paint coverage and cleaner jobs. When the paint rack 10 is not in use, it can be placed in a storage position, FIG. 4, with the telescoping clamp arms 30 placed in their innermost positions such that less floor space is required to store the unused paint racks 10.

The component parts of the paint rack 10 are of steel construction and finished with a powder coat finish.

In actual use conditions, a paint rack 10 having a pair of support carriages 20 each holding or receiving four adjustable clamp arms 30 with the associated swivel mounted clamps 34 mounted thereon has been used although it is understood that a single support carriage 20 with the there associated clamp arms 30 and swivel mounted clamps 34, providing up to four "arms" and clamps, could be used. Likewise, additional support carriages 20 with the there associated clamp arms 30 and swivel mounted clamps 34 could be used with more than eight clamp arms 30 and clamps 34 provided.

Although the present invention has been described in considerable detail with reference to certain preferred versions thereof, other versions are possible. Therefore, the spirit and scope of the appended claims should not be limited to the description of the preferred versions contained herein.

Changes and modifications in the specifically described embodiments can be carried out without departing from the scope of the invention which is intended to be limited only by the scope of the appended claims.

What is claimed is:

1. A mobile paint rack apparatus for supporting one or more vehicle parts or accessories for spray painting, comprising:

a base;

an upright mounted on said base;

at least one support carriage adjustably mounted on said upright;

a plurality of adjustable clamp arms received by said support carriage;

means for positioning said adjustable clamp arms in a plurality of positions;

adjustable swivel clamp means, mounted to a proximal end of each adjustable clamp arm, for fastening items to be painted to said apparatus such that no exterior surface of the item to be painted is held by the apparatus, wherein each said adjustable clamp arm has a swivel ball formed on a proximal end thereof for mounting said swivel clamp means;

and a second support carriage mounted on said upright and on top of the first support carriage, said second support carriage for receiving a second plurality of adjustable clamp arms.

2. The apparatus of claim 1, wherein said base further comprises four feet interconnected by a base plate, each foot having a roller mounted thereto to provide mobility to the rack apparatus.

3. The apparatus of claim 1, wherein said upright is of unitary construction.

4. The apparatus of claim 1, wherein said upright is of multiple sections that fit together with male ends received by female ends.

5. The apparatus of claim 1, further comprising screw fasteners with positioning knobs whereby said adjustable support carriage is positionable along the length of said upright.

6. The apparatus of claim 1, further comprising a socket receiver mounted on said swivel clamp means for receiving said swivel ball for movement of said swivel clamp means in a full circle about said swivel ball.

7. The apparatus of claim 6, further comprising at least one screw fastener that fixedly positions said swivel clamp means in a desired position.

8. The apparatus of claim 7, wherein said socket receiver further includes an aperture formed therein on a side opposite said screw fastener, said aperture to receive and provide fixed position of said swivel ball of said swivel clamp means when torque is applied to said screw fastener.

9. The apparatus of claim 1, further comprising rollers attached to said base, for providing ease of moving said mobile paint rack apparatus for use and for storage.

10. The apparatus of claim 1, wherein each of said plurality of clamp arms is positionable such that an article to be painted is positionable by one clamp arm.

11. The apparatus of claim 1, wherein said plurality of clamp arms is positionable such that an article to be painted is attachable by two clamp arms, said two clamp arms positioned at a distance less than one foot apart.

12. The apparatus of claim 1, wherein said plurality of clamp arms is positionable such that an article to be painted is attachable by two clamp arms, said two clamp arms positioned at a distance of more than one foot but less than three feet apart and any distance therebetween.

13. The apparatus of claim 1, wherein said plurality of clamp arms is positionable such that an article to be painted is attachable by more than two clamp arms, said more than two clamp arms positioned at a distance of more that one foot but less than the length of the upright and any distance therebetween.

14. The apparatus of claim 1, further comprising means for shielding said means for positioning said adjustable clamp arms from paint over-spray.

15. The apparatus of claim 1, further comprising means for shielding said adjustable swivel clamp means from paint over-spray.

16. The apparatus of claim 1, wherein said adjustable swivel clamp means includes a clamp pin, mounted on the pinching end of said swivel clamp means, said pin extending from both sides of the swivel clamp means such that interior portions of the item to be painted is captured by the points of said pin such that no exterior surface of the item to be painted is touched by the apparatus.

17. The apparatus of claim 1, wherein said adjustable swivel clamp means, mounted to a proximal end of each adjustable clamp arm, fastens items to be painted to said apparatus such that the items to be painted are positioned in such a manner to enable painting in an upright position.

18. A mobile paint rack apparatus for supporting one or more vehicle parts or accessories for spray painting, comprising:

a base;

an upright mounted on said base;

at least one support carriage adjustably mounted on said upright;

a plurality of adjustable clamp arms received by said support carriage;

means for positioning said adjustable clamp arms in a plurality of positions;

adjustable swivel clamp means, mounted to a proximal end of each adjustable clamp arm, for fastening items to be painted to said apparatus such that no exterior surface of the item to be painted is held by the apparatus;

wherein said adjustable clamp arms further comprise tubular structures that are received by receiver tubes of said support carriage, such that said adjustable clamp arms are rotatable within the receiver tubes 360 degrees which enable said adjustable clamp arms to be positioned in an extremely wide variety of positions on said support carriage.

19. The apparatus of claim 18, wherein the adjustable swivel clamp means includes a clamp pin, mounted on a pinching end of said swivel clamp means, said pin extending from both sides of the swivel clamp means such that interior portions of the item to be painted is captured by the points of said pin such that no exterior surface of the item to be painted is touched by the apparatus.

20. The apparatus of claim 18, wherein said adjustable swivel clamp means, mounted to a proximal end of each adjustable clamp arm, fastens the items to be painted to said apparatus such that the items to be painted are positioned in such a manner to enable painting in an upright position.

21. A mobile paint rack apparatus for supporting one or more vehicle parts or accessories for spray painting, comprising;

a base;

an upright mounted on said base;

at least one support carriage adjustably mounted on said upright;

a plurality of adjustable clamp arms received by said support carriage;

means for positioning said adjustable clamp arms in a plurality of positions;

adjustable swivel clamp means, mounted to a proximal end of each adjustable clamp arm, for fastening items to be painted to said apparatus such that no exterior surface of the item to be painted is held by the apparatus;

each said adjustable clamp arm has a swivel ball formed on a proximal end thereof for mounting said swivel clamp means;

a socket receiver mounted on said swivel clamp means for receiving said swivel ball;

at least one screw fastener that fixedly positions said swivel clamp means in a desired position;

said socket receiver further includes an aperture formed therein on a side opposite said screw fastener, said aperture to provide fixed position of said swivel clamp means with a generally lesser amount of torque applied, and wherein said adjustable clamp arms further comprise tubular structures that are received by receiver tubes of said support carriage, such that said adjustable clamp arms are rotatable within the receiver tubes 360 degrees which enable said adjustable clamp arms to be positioned in an extremely wide variety of positions on said support carriage.

22. A mobile paint rack apparatus for supporting one or more vehicle parts or accessories for spray painting, comprising;

a base;

an upright mounted on said base;

at least one support carriage adjustably mounted on said upright;

said support carriage having at least a pair of receiver tubes;

at least one pair of clamp arms, tubular structures, are received by the receiver tubes of said support carriage, such that said clamp arms are rotatable within the receiver tubes 360 degrees which enable said clamp arms to be positioned in an extremely wide variety of positions on the support carriage;

means for positioning said clamp arms in a plurality of positions; and adjustable swivel clamp means, mounted to a proximal end of each clamp arm, for fastening items to be painted to said apparatus such that the items to be painted are positioned in such a manner to enable painting in an upright position such that no exterior surface of the item to be painted is held by the apparatus.

23. The apparatus of claim 22, wherein the adjustable swivel clamp means includes a clamp pin, mounted on a pinching end of said swivel clamp means, said pin extending from both sides of the swivel clamp means such that interior portions of the item to be painted is captured by the points of said pin such that no exterior surface of the item to be painted is touched by the apparatus.

24. A mobile paint rack apparatus for supporting one or more vehicle parts or accessories for spray painting, comprising:

a base;

an upright mounted on said base;

at least one support carriage adjustably mounted on said upright;

a plurality of adjustable clamp arms received by said support carriage;

means for positioning said adjustable clamp arms in a plurality of positions;

means for shielding said means for positioning said adjustable clamp arms from paint over-spray;

adjustable swivel clamp means, mounted to a proximal end of each adjustable clamp arm, for fastening items to be painted to said apparatus such that no exterior surface of the item to be painted is held by the apparatus; and a second support carriage mounted on said upright and on top of the first support carriage, said second support carriage for receiving a second plurality of adjustable clamp arms.

25. A mobile paint rack apparatus for supporting one or more vehicle parts or accessories for spray painting, comprising:

a base;

an upright mounted on said base;

at least one support carriage adjustably mounted on said upright;

a plurality of adjustable clamp arms received by said support carriage;

means for positioning said adjustable clamp arms in a plurality of positions;

adjustable swivel clamp means, mounted to a proximal end of each adjustable clamp arm, for fastening items to be painted to said apparatus such that no exterior surface of the item to be painted is held by the apparatus;

means for shielding said adjustable swivel clamp means from paint over-spray; and a second support carriage mounted on said upright and on top of the first support carriage, said second support carriage for receiving a second plurality of adjustable clamp arms.

* * * * *

UNITED STATES PATENT AND TRADEMARK OFFICE

CERTIFICATE OF CORRECTION

PATENT NO. : 7,445,184 B1 
APPLICATION NO. : 10/836579
DATED : November 4, 2008
INVENTOR(S) : Bryan Thomas Johnson It is certified that error appears in the above-identified patent and that said Letters Patent is hereby corrected as shown below:

In column 1, line 37, please delete "carnage" and insert --carriage--;

In column 3, line 3, please delete "pain track" and insert --paint rack--;

In column 3, line 15, please add --38-- in between "slot" and "formed";

In column 3, line 23, please add --88-- in between "pin" and "extending";

In column 3, line 25, please delete "83" and insert --88--;

In column 3, line 31, please add --34-- in between "clamp" and "is";

In column 4, line 36, please add --34-- in between "clamp" and "for".

Signed and Sealed this

Twenty-first Day of April, 2009

JOHN DOLL
*Acting Director of the United States Patent and Trademark Office*